Dec. 17, 1929.　　　　F. PORSCHE　　　　1,739,859

BLOWER SET FOR COMBUSTION MACHINES

Filed Jan. 14, 1925

Patented Dec. 17, 1929

1,739,859

UNITED STATES PATENT OFFICE

FERDINAND PORSCHE, OF STUTTGART-UNTERTURKHEIM, GERMANY, ASSIGNOR, BY MESNE ASSIGNMENTS, TO DAIMLER-BENZ AKTIENGESELLSCHAFT, OF BERLIN, GERMANY

BLOWER SET FOR COMBUSTION MACHINES

Application filed January 14, 1925, Serial No. 2,456, and in Germany August 20, 1924.

This invention relates to a combustion machine with a blower, especially a blower of the Roots type, which serves for charging the cylinders at over-pressure.

With machines of this kind heretofore the blower and the coupling were built into the machine, each separately for itself, so that the coupling has been an inherent part of the power plant assembly.

This construction renders the assembling of the power-plant difficult and increases the costs of manufacture. Also, the inspection of the coupling as ordinarily constructed is inconvenient and takes a relatively great amount of time.

In order to obviate these drawbacks, according to this invention the blower and the coupling are formed in a unitary apparatus, which is connected with a driving element of the internal combustion engine.

In the construction according to this invention, the blower and the coupling can be readily united with each other and mounted in operative relation to the engine as a unitary structure which is connected in a very simple manner to the engine. Also, for the purposes of inspecting, no difficulties will arise, since after disconnecting the unitary structure from the rim of the aperture in the motor casing, with part of the driving connection which normally projects beyond the housing of the unitary structure before shiftable into said housing, the latter together with its coupling and other parts may be easily removed as a unit for inspection or repair.

Referring now in detail to the several figures in which an illustrative but not limitative embodiment of the invention is shown, the unitary structure includes upper and lower casings $a$ and $b$ respectively, having their plane of separation between their flanged ends $u$ and $u'$, and joined together in any suitable manner.

The casings are so designed that while the unitary device may conveniently rest with its flanges supported upon parts of the engine structure, as shown, the lower casing extends to a position in front of the engine crank shaft.

The upper casing $a$ houses the blower proper, which being preferably of the Roots type, has two correlated rotors, the shafts of which are shown at $x$ and $y$, said shafts being provided with intermeshing gears insuring a positive drive for both rotors, while one shaft is furnished with a driving gear $z$ in connection with coupling mechanism which, in the main, is housed within the lower casing.

Figure 1:
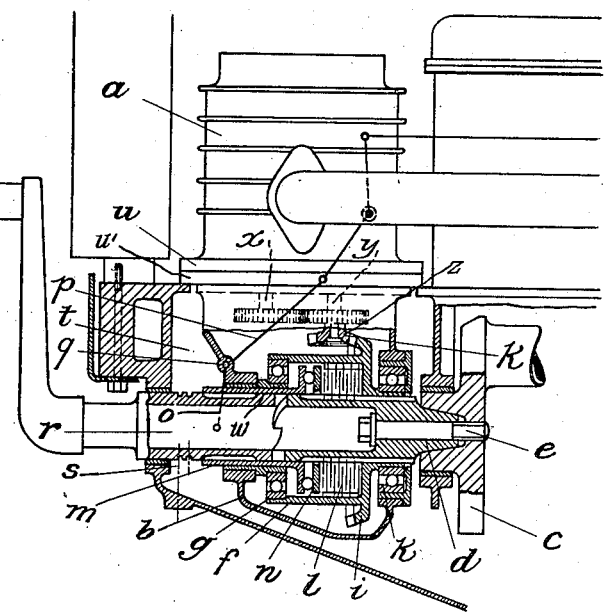
Fig. 1 is a view partly in vertical section of the blower showing the power transmission and the connection of the same to the engine crank shaft.
Figure 2:
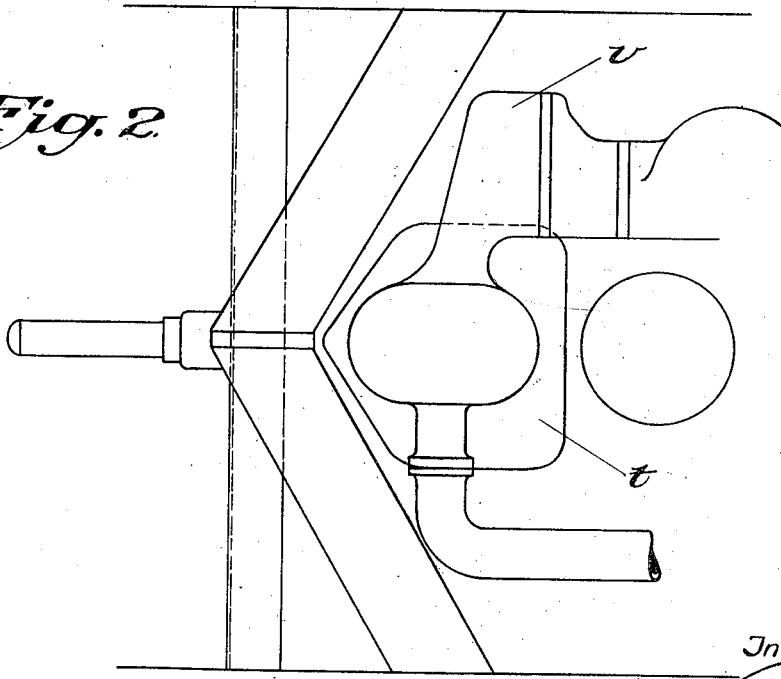
Fig. 2 is a plan view.

The lower casing $b$ is apertured in its front and rear walls coaxially with the axis of the crank shaft. A crank shaft extension or coupling member $d$ is disposed within the casing, having a normally projecting end, adjacent the crank shaft which fits into a correspondingly shaped depression in said crank shaft. The crank shaft extension is preferably hollow and formed with a bore for the reception of a cap screw $e$ by means of which the crank shaft extension may be fixed to the crank shaft. The free end of the crank shaft extension is formed with teeth or serrations for engagement with the useful hand crank, the latter being introduced through the aperture on the opposite wall of said casing. It is obvious that upon removing the hand crank, a suitable tool may be introduced into the crank shaft extension for unscrewing the cap screw $e$. When this has been removed, the entire unitary device may be lifted out, it being understood of course that the induction and eduction conduits of the blower however has been detached, also any means of securement which may be associated with the flanges $u$ and $u'$ for fixing the unitary device to the adjacent structure. It will be noted from Figure 1 that the dimensions of the aperture through which the unitary device is inserted into juxtaposition with the engine, is only substantially large enough to admit the lower casing. To permit the easy insertion or withdrawal of the device from such an aperture, the crank shaft extension is withdrawable entirely within the lower casing when it has been detached from the crank shaft. This withdrawal is effected by means introduced through the aperture through which the hand crank is inserted.

The crank shaft extension $d$ constitutes the inner element of a clutch and is provided on its outer surface with a set of disks, splinably mounted as shown, in the usual manner. These disks interleave with a complementary set of disks mounted in similar manner on the inside of the outer clutch element $f$. The outer member has the form of a drum, which houses the clutch plates after the manner of devices of its kind, and has a bevelled gear $i$ meshing with the driving gear $z$ of the blower shaft. The ends of the plate drum $f$ are supported in ball bearings $g$ and $h$ mounted within the casing $b$. The bearing $g$ is carried by a tubular member $w$ supported by the casing $b$, which tubular member forms a guide for a sleeve $m$ carrying a clutch thrust plate $n$. The inner end of the crank shaft extension $d$ extends within the sleeve $m$ the latter forming a support and guide for this end of the crank shaft extension permitting the latter to be withdrawn axially of the crank shaft when it is desired to remove the unitary structure.

For operating the sleeve $m$, for clutching or de-clutching, there is provided an operating mechanism $o$, $p$, which is pivotally mounted in the casing $b$ at the point $q$ and may be operated from the seat of the driver. Within the sleeve $w$ there is further guided the starting crank $r$, which in the well-known manner is inserted in the shaft $d$ having a ratchet interposed. The crank is kept in its thrown-in and thrown-out position in the known manner by means of a catch as indicated at $s$.

The casing $b$ and the blower $a$ are positioned within a depression of the motor-casing and are fastened by means of a flange $u$. Also the silencer $v$ for the blower is connected to the casing $a$.

According to this invention the blower, the coupling, the silencer and the operating mechanism are united to form a common structure, which as a whole may be inserted and withdrawn from the machine.

The entire unitary structure comprising blower, coupling, silencer and operating mechanism is mounted within the depression $t$ of the motor casing. Thereupon the shaft $d$ is introduced and drawn tight by means of the screw $e$ provided in the crank shaft. After having the starting crank introduced into the sleeve $m$, the mounting of the apparatus within the motor is completed.

In order to connect the set with the motor according to this invention, therefore, only the shaft $d$ is used which is drawn tight by the screw $e$. The device according to this invention therefore excels by the simplicity and superiority of its construction.

I claim:—
1. In an internal combustion engine, in combination, an engine crank shaft, a casing, blower mechanism therein, a second casing secured to the first casing, clutch mechanism in the second casing releasably connected to the blower mechanism, and a single coupling member forming the sole operative connection between the clutch mechanism and engine, and being detachably connected to the engine crank shaft connected to the clutch mechanism and detachably connected to the engine crank shaft whereby upon the disengagement of the single coupling member from the crank shaft the blower and clutch mechanisms in their united casings are removable as a unit.

2. In an internal combustion engine, in combination, an engine crank shaft, a casing, blower mechanism therein, a second casing secured to the first casing, clutch mechanism in in the second casing releasably connected to the blower mechanism, a single coupling member connected to the clutch mechanism and detachably connected to the engine crank whereby upon the disengagement of the single coupling member from the crank shaft the blower and clutch mechanisms in their casings are removable as a unit, and a hollow member extending to the exterior of the second casing through which a tool may be inserted for effecting the disengagement of the coupling member from the crank shaft.

3. In an internal combustion engine, in combination, an engine crank shaft, a casing, blower mechanism therein, a second casing secured to the first casing, clutch mechanisms in the second casing releasably connected to the blower mechanism, a single coupling member connected to an element of the clutch mechanism and detachably connected to the engine crank shaft whereby upon the disengagement of the single coupling member from the crank shaft the blower and clutch mechanisms in their casings are removable as a unit, and a hollow clutch actuating mechanism actuating member extending to the exterior of the second casing and receiving the coupling member whereby access is had to the coupling member for disconnecting it from the crank shaft.

4. In an internal combustion engine, in combination, an engine crank shaft, casing, blower mechanism therein, a second casing secured to the first mentioned casing, a hollow clutch member including plates journalled in the second casing and operatively connected to the blower mechanism, a second coupling member furnished with clutch plates rotatable within the first mentioned clutch member and detachably connected to the crank shaft, and a tubular clutch actuating member extending to the exterior of the second casing and receiving the coupling member whereby access is had to the coupling member for disconnecting it from the crank shaft.

5. In an internal combustion engine assembly, a blower driven by the internal combustion engine for feeding fuel or a constituent thereof, at over pressure thereto, driving mechanism for said blower including gearing, said blower and driving mechanism being constructed as a unit, and means for detachably connecting said unit to a driving element of the engine, permitting the removal of said unit.

6. In an internal combustion engine assembly, a blower driven by the internal combustion engine for feeding fuel or a constituent thereof at over pressure thereto, driving mechanism for said blower including a clutch coupling, said blower and driving mechanism being constructed as a unit, and means for detachably connecting said unit to a driving element of the engine, permitting the removal of said unit.

7. In an internal combustion engine assembly, a blower driven by the internal combustion engine for feeding fuel or a constituent thereof at over pressure thereto, driving mechanism for said blower including a clutch coupling, said blower and driving mechanism being constructed as a unit, means for detachably connecting said unit to a driving element of the engine, and complementary upper and lower casings for said blower and driving mechanism respectively, said casings being unitarily joined to form a housing for the enclosed parts removable unitarily independently of the associated engine structure.

8. In an internal combustion engine assembly, a blower driven by the internal combustion engine for feeding fuel or a constituent thereof at over pressure thereto, driving mechanism for said blower including a clutch coupling, complementary upper and lower casings for said blower and driving mechanism respectively, said casings being unitarily joined forming a housing for the enclosed parts removably independently of the associated engine structure, said driving mechanism including a member adapted to be detachably secured to a driving element of the engine, and having a projecting portion, said member being capable of being shifted entirely within the confines of the housing after having been detached from said driving element.

9. In an internal combustion engine assembly, a blower driven by the internal combustion engine for feeding fuel or constituent thereof at over pressure thereto, driving mechanism for said blower including a clutch coupling, a housing common to said blower and driving mechanism, constituting these parts into a unit, said driving mechanism including a member having a portion protruding from said housing and tapered to fit a correspondingly tapered recess in a driving element of the internal combustion engine, means for detachably securing said member to said driving element, said member being retractable within said housing when detached from said driving element, to permit withdrawal of said housing with the enclosed parts as a unit through an aperture in the associated structure not substantially greater than the size of said housing in the plane of said aperture.

10. In an internal combustion engine assembly, a blower driven by the internal combustion engine for feeding fuel or a constituent thereof at over pressure thereto, driving mechanism for said blower including a clutch coupling, a housing common to said blower and driving mechanism constituting these parts into a unit, said driving mechanism including a member having a portion protruding from said housing and tapered to fit a correspondingly tapered recess in a driving element of the internal combustion engine, means for detachably securing said member to said driving element, said member being retractable within said housing after having been detached from said driving element, to permit the withdrawal of said housing as a unit through an aperture in the associated engine structure not substantially larger than the size of said housing in the plane of said aperture, said member forming a continuation of the crank shaft of the internal combustion engine when secured thereto.

11. In an internal combustion engine assembly, a blower driven by the internal combustion engine for feeding fuel or a constituent thereof at over pressure thereto, driving mechanism for said blower including a clutch coupling, a housing common to said blower and driving mechanism constituting these parts into a unit, said driving mechanism including a member having a portion protruding from said housing and adapted to be secured to a driving element of the internal combustion engine, said member being retractable within said housing after having been detached from said driving element, to permit the withdrawal of the housing as a unit through an aperture not substantially larger than the size of the housing in the plane of said aperture, said retractable member being formed with means interengageable with a hand crank, the opposite wall of said housing being formed with an aperture for the introduction of said hand crank.

12. In an internal combustion engine assembly, a blower driven by the internal combustion engine for feeding fuel or a constituent thereof at over pressure thereto, driving mechanism for said blower, a unitary housing for said blower and driving mechanism, said driving mechanism including a member in part protrusible from said housing for connecting said member to a driving element of the internal combustion engine, said member being freely retractable into said casing after having been detached from said driving element.

13. In an internal combustion engine assembly, a blower driven by the internal combustion engine for feeding fuel or a constituent thereof, at over pressure thereto, driving mechanism for said blower, a unitary housing for said blower and driving mechanism, the latter including a member adapted to be connected to a driving element of the engine, said housing being apertured on opposite sides in alignment with said member, the latter being in part protrusible through the aperture on one side of said housing into operative position relative to said driving element, said member being freely shiftable axially of said driving element to a position wholly within said housing after having been detached from said driving element, the aperture in the opposite side of said housing giving access to a tool for so shifting said member.

14. In an internal combustion engine assembly, a blower driven by the internal combustion engine for feeding fuel or a constituent thereof at over pressure thereto, driving mechanism for said blower including a clutch, a casing for said driving mechanism, the latter including a member in part protrusible from from said casing for connecting said driving mechanism to a driving element of the internal combustion engine, clutch plates slidable but nonrotatably mounted upon said member, a cooperating clutch member having plates similarly mounted, said clutch member being in releasable engagement with said blower, said member being retractable into said casing when detached from said driving element without disturbing the operative relation of said clutch plates.

15. In an internal combustion engine assembly, a motor casing having an aperture forwardly of the crank shaft, a unitarily removable housing having a blower in its upper part and gearing for operating said blower in its lower part, extending through said aperture to a position intersecting the projected axis of the engine crank shaft and resting intermediately upon said motor casing, said gearing including clutch mechanism detachably connected to the engine crank shaft.

16. In an internal combustion engine assembly, a blower unit for supercharging the engine comprising a housing supported forwardly of the engine, said housing having a compressor above, and the driving means therefor below, said unit being positioned with an axis of the driving means substantially in line with the axis of the engine crank shaft, and detachable means for coupling said driving means and crank shaft, said housing having a tubular passage extending therethrough in line with said coupling means, giving access to the latter from the forward side of said blower unit.

17. In an internal combustion engine assembly, an engine support, a blower unit comprising a housing seated on the rim of an opening in said support and having a portion extending through said opening below said rim, said downwardly extending portion enclosing driving means for said blower, and a member constituting a part of said driving means arranged normally to extend from said housing into operative relation to the engine crank shaft and being arranged to be retracted within said housing after disconnection from said crank shaft to permit the housing to be unobstructedly translated upwardly through said opening in the act of removing the blower from said assembly.

18. In an internal combustion engine assembly, a blower driven by the internal combustion engine for feeding fuel or a constituent thereof at overpressure thereto, gearing for driving said blower and detachable means for connecting said gearing operatively to the engine, said blower, gearing and connecting means being constructed as a unit, and removable as a unit from said engine assembly when the connecting means is detached from said engine.

19. In an internal combustion engine assembly, a blower driven by the internal combustion engine for feeding fuel or a constituent thereof at over pressure thereto, gearing for driving said blower and detachable means including a clutch coupling for connecting said gearing operatively to the engine, said blower, gearing and connecting means being constructed as a unit, and removable as a unit from said engine assembly when the connecting means is detached from said engine.

In testimony whereof I affix my signature.

FERDINAND PORSCHE.